(12) United States Patent
Garcia et al.

(10) Patent No.: US 6,382,070 B1
(45) Date of Patent: May 7, 2002

(54) METHOD AND APPARATUS FOR DEACTIVATING ACTIVE LANDMINDS

(76) Inventors: Rodolfo Garcia, 2500 Witshire Blvd., Suite 742, Los Angeles, CA (US) 90057; Maurice M. Garcia, 3016 Cambridge Pl., NW., Washington, DC (US) 20007

( * ) Notice: Subject to any disclaimer, the term of this patent is extended or adjusted under 35 U.S.C. 154(b) by 0 days.

(21) Appl. No.: 09/585,654

(22) Filed: Jun. 1, 2000

(51) Int. Cl.[7] .............................................. F41H 11/12
(52) U.S. Cl. ........................................ 89/1.13; 89/1.11
(58) Field of Search .................................. 89/1.13, 1.11

(56) References Cited

U.S. PATENT DOCUMENTS

| | | | | |
|---|---|---|---|---|
| 4,232,417 A | * | 11/1980 | Miller et al. | 9/314 |
| 4,307,529 A | * | 12/1981 | White et al. | 119/29 |
| 4,866,439 A | * | 9/1989 | Kraus | 340/945 |
| H1533 H | * | 6/1996 | Bowers et al. | 89/1.11 |
| 6,192,766 B1 | * | 2/2001 | Gardhagen et al. | 73/863.12 |

* cited by examiner

*Primary Examiner*—Stephen M. Johnson

(57) ABSTRACT

The present invention relates generally to a method and related devices for the deactivation of landmines. More particularly, the present invention includes several devices used to carry out a method of training live animals, such as rats, to seek out and destroy active landmines in the field, or to localize, unearth, and mark the location of active mines, thereby reducing the danger of their later removal by valuable sniffing mine clearing animals, technology, and mine clearing personnel, making a landmine clearance effort more effective and efficient.

7 Claims, 6 Drawing Sheets

Front shoulder straps and harness

Rear abdominal strap

Pellets are released from rear opening

KD

Rear view:

Rear opening

Side rear view:

FIGURE 1: A simulated landmine containing most common physical features; Dummy Landmine (DLM)

FIGURE 2: The Conical Perforated Containers (CPC). These dispense both the TNT scent and the addictive drugs shown on a DLM (a) and in close-up (b)

Figure 4: The Mobile Triangular Enclosure (MTE) with three equidistant sides and posts

FIGURE 5
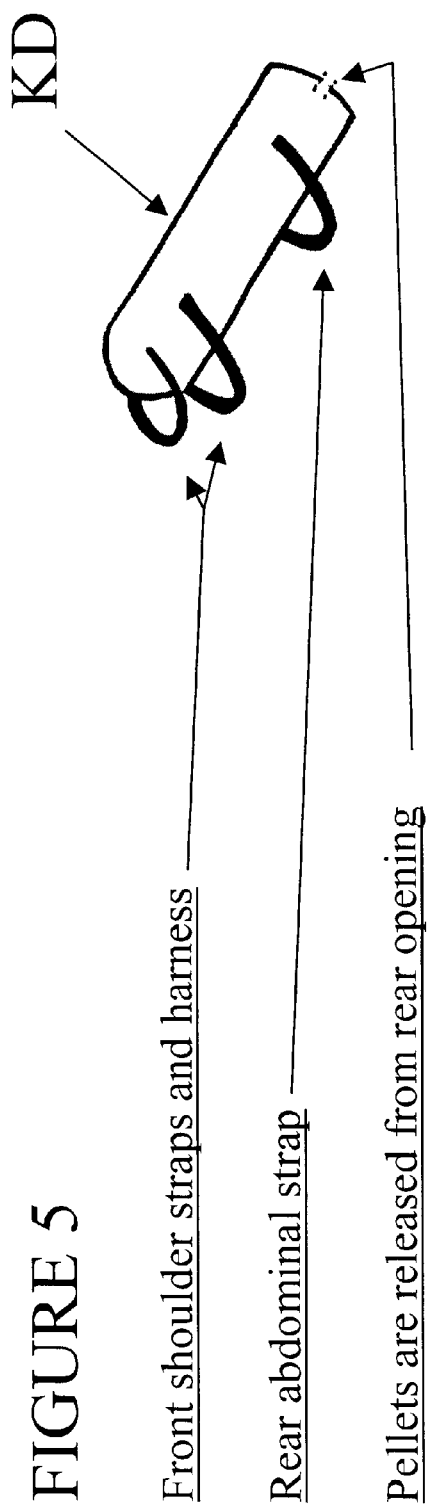
Front shoulder straps and harness
Rear abdominal strap
Pellets are released from rear opening
Rear view:
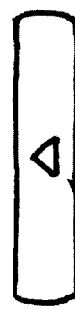
Rear opening
Side rear view:

"Top view (External - front to rear)"

METHOD AND APPARATUS FOR DEACTIVATING ACTIVE LANDMINDS

BACKGROUND OF THE INVENTION

1. Area of the Art

The present invention relates generally to a method and related devices for the deactivation of landmines. More particularly, the present invention includes several devices used to carry out a method of training live animals, such as rats, to seek out and destroy active landmines in the field, or to localize, unearth, and mark the location of active mines, thereby reducing the danger of their later removal by valuable sniffing mine clearing animals, technology, and mine clearing personnel, making a landmine clearance effort more effective and efficient.

2. Description of the Related Art

In many areas around the world, thousands of landmines which have not been removed from previous armed conflicts remain active and intact. This poses a grave and constant threat to human inhabitants, particularly children. The cost in the loss of lives and livelihood is unacceptably high and the cost to meticulously clear these areas using conventional approaches is equally prohibitive.

To make matters worse, the hilly and irregular terrain makes the use of conventional bulldozers and other general methods impractical and difficult. Current methods of clearing or deactivating land mines can be generally divided into four categories: (1) human-directed field detection, mostly employed in poor developing nations, whether by sophisticated hand held devices or through the use of highly dangerous methods of attempting to deactivate the landmines directly; (2) bomb or land mine-sniffing dogs that are trained to locate and trace vapors or odors of the landmine explosive materials which leak over time; (3) high-tech equipment and computers which analyze collected air samples to detect explosive materials in the atmosphere, as well as sophisticated and expensive mapping methods; and (4) heavy, military motorized equipment or vehicles. Unfortunately, only with the exception of the most primitive methods of detecting landmines, which offer the greatest risk of loss in human life, all of these methods are extremely costly. Cost has been the overwhelming limiting factor to widespread efforts to clear active landmine fields in the world.

For instance, whereas dogs have proven to be highly effective detection agents, each dog costs over $50,000 to train and to continue to be effective in the face of changing mine modalities, each dog requires regular skills maintenance and additional training. Furthermore, other limitations besides their high cost are equally discouraging: (1) trained dogs are occasionally casualties themselves because over time, a significant percentage of these animals die as casualties in the field; (2) the long-term use of trained dogs is not possible because although dogs can be well-trained based only on praise and affection from their human on trainers masters, these "stimuli" prove to wane in strength over time. Inevitably, as this occurs, the level of risk to the training personnel increases; (3) the use of trained dogs depends heavily on the presence and interaction with a trained human de-miner which still imposes a great element of risk to human life; (4) the training is "task" specific because dogs only learn how to locate landmines, and once they have located them, training dogs to avoid detonating a landmine is extremely difficult, presenting a high degree of inadvertently setting off remote booby-trap mechanisms; (5) as dogs are limited to only localizing mines, the two problems of unearthing and disposing of the localized mines remain; and (6) dogs only provide guidance and information as to the location of a landmine in a relatively large general area, ineffective for safe pin-point detection of landmines for human clearers.

High-tech or heavy equipment/vehicles all are prohibitively expensive and hence unrealistic for most developing nations where the greatest number of active landmine fields.

Another problem with the methods and devices described above is poor accessibility to the active landmine field areas. Transporting mine-clearing specialists, dogs, high-tech and heavy equipment to remote areas is a great obstacle in clearance efforts.

Most importantly, current methods and devices pose an extremely dangerous risk to landmine clearance personnel. The best of trained personnel, even with extensive education and sound judgment, are constantly subject to great risk because of the possibilities of error and missed detection. Even with the aid of a highly trained dog having extensive experience, humans life is seriously at risk. Therefore, methods and devices used in clearing and disarming active land mines must maximize the protection of trained human specialists.

Therefore, in order to fulfill these safety requirements and be equally successful in effecting a complete disablement of active landmines, an approach to the global landmine problem must address and consider a number of critical and essential, including factors: (1) landmine design constraints; (2) accessibility over difficult terrain and remote topography of landmines; (3) detection difficulties due to low to zero metal content, small size, and camouflage properties; (4) novel "booby trap" mechanisms; (5) economically feasible disposal methods and; (6) dangers from ongoing regional conflicts imposed on human mine clearing personnel.

SUMMARY OF THE INVENTION

It is an object of the present invention to provide a cost-effective method and related devices for the disarming of active landmines which can minimize risks to the lives of trained personnel and animals. This and the other objects and advantages are achieved by using rodent rats or other suitable animals to perform the most dangerous tasks of landmine clearance, namely the steps of localizing and unearthing landmines.

It is a further object of the present invention to provide a method that is highly flexible, synergistic and complementary to other conventional methods presently employed.

Another aspect of the present invention provides a flexible implementation strategy which is cost-effective and feasible to achieve in a short period of time. The apparatus and method of the present invention can be implemented, managed and used not only by professionally trained persons but by the inhabitants of the landmine area who are directly affected by the presence of active landmines in their communities, after receiving the necessary training and technical guidance. This reduces the need for the presence professionally trained personal in the field thus significantly reducing the operational costs.

Another object of the present invention is to implement a simple, low-tech, and widely accessible method for the preliminary detection of landmines in the field which exploits the existence of a common substance present in most active landmines.

Another aspect of the present invention is to provide a method for precisely identifying the location of landmines by using objects to mark landmine sites or using interactive electronic signaling devices, and mapping techniques.

DESCRIPTION OF THE FIGURES

The above-mentioned and other features of this invention and the manner of obtaining them will become more apparent, and will be best understood by reference to the following description, taken in conjunction with the accompanying drawings. These drawings depict only a typical embodiment of the invention and do not therefore limit its scope. They serve to add specificity and detail, in which:

FIG. 5 shows a Knapsack Device (KD).

DETAILED DESCRIPTION OF THE INVENTION

Figure 1:
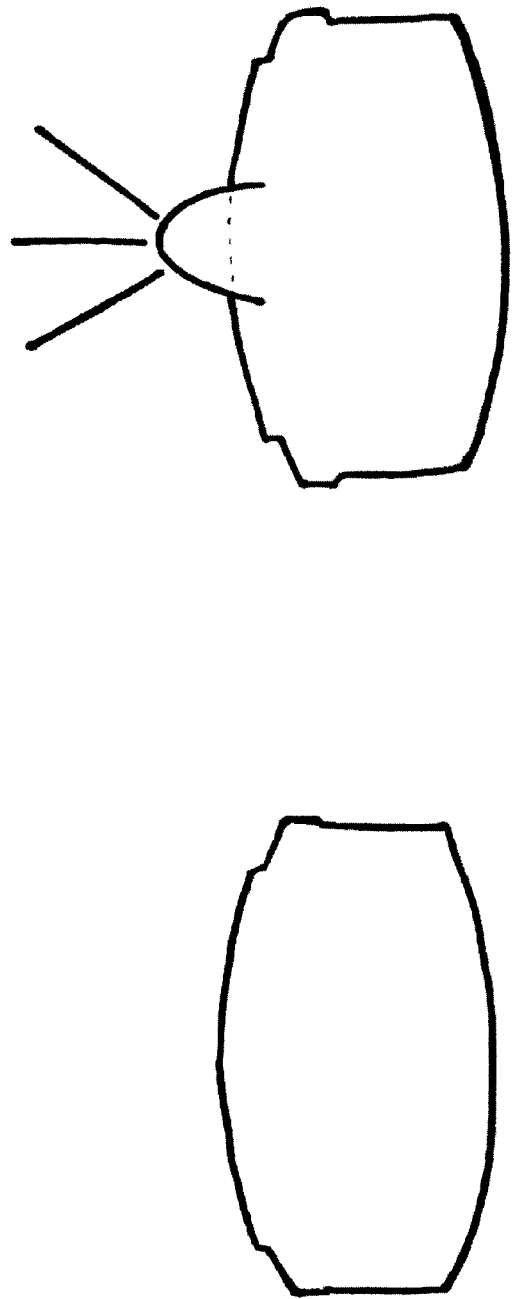
FIG. 1 shows a typical landmine area with Dummy Land Mines (DLM).

The present invention provides a method and a series of devices for deactivating landmines which includes the training of animals such as rodent rats to seek out and dig up landmines by using the faint scent of common explosives and the training of animals to aid in the localization of landmines by using methods and devices capable of marking the location of landmines in a number of different ways.

Because the vast percentage of active mines use TNT (trinitrotoluene) and other explosive products containing nitrate or nitrate based compounds, this inherent characteristic found in most active landmines can be effectively exploited by using nitrate odor to implement a method having broad application to localize, unearth, and detonate active mines. Specifically, rats, or other animal, having similar detection and training capabilities will be cross-conditioned to associate an addictive drug or a combination of various addictive drugs, which can be orally self-administered by the rat themselves, with the aromatic scent of nitrates containing explosives. Such conditioning or training of rats will be achieved by providing the addictive drug, in odorless form, from an appropriate dispenser buried on the ground that resembles a landmine present in the area in question. These animals seek out the scent of the explosives with the trained determination to obtain the addictive drug or drug combinations. As they disrupt the nearby soil and partially dig up the landmine area searching for the addictive drug they perform critical and essential steps in the process of identifying and locating landmines.

Other related methods include features that maximize greater precision in a pin-point location of the landmines. Precise localization of buried or unearthed mines can be achieved by a spectrum of different modalities based upon the degree of dependence on technology and cost: (a) the dropping of colored pellets to mark the pin-point location or exact site where the rat has spent a significant long period of time unearthing a mine; (b) the use of an electronic "signal emitting" device attached onto the rat's body or an apparatus worn by the rats, wherein from a plotting of the rats' movements, one is able to extrapolate the precise location of the terrain the rat has spent a disproportionate amount of time, which are possibly the active landmine sites; (c) the rat is conditioned to perform a specific behavior once a mine is localized and unearthed. Such behaviors (e.g. circling the mine once or a number of times, etc) would be one that is easily interpretable on a tracking computer program because of the "tagged" tracking system employed; (d) the rats may wear a "catheter jacket" device or a small Knappsack Device (KD) with similar tracking functions, having both a "tag" (e.g., electronic signal emitting chip) and some type of prominent object (such as a small bright red ball) which the rat may drop on the ground after it has found a mine. Identification of the exact location of a mine may be achieved by a number of technical devices, including GPS technology, using either a satellite, or a minefield-specific "GPS mapping system", whereby a triangular electric "field" is created, and within which the rats are allowed to operate.

The major steps of the processes and of the devices of the present invention are described in more detail below:

1) Laboratory training of rats requires the development of a cross-addiction in the animals to certain drugs such as nicotine, methamphetamine and/or similar substances, with the scent of TNT and related nitrate compounds. In other words, animals associate the scent of TNT or related nitrate compounds with the addictive substances. Particularly, the specific training process of the animals would include male adults rats being trained to become addicted to an odorless, minimal-taste, highly addictive drug, which would be administered to rats only in the presence of nitrate containing vapors of similar quality and concentration as those which dogs are trained to detect, follow, and locate. Essentially, the rats are conditioned to associate their olfactory stimulus of "bomb-nitrates or nitrate-smelling substances," with a highly addictive substance which is coupled with food and then only to the nitrate scent. Namely, the rats are conditioned or trained to believe that the addictive drug is synonymous with "following" and "seeking" the distinctive olfactory profile of "bomb-smelling" nitrate substances. Alternately, the development of the rats could be coupled with manipulation of certain genetic traits, thus the training of the animals could be enhanced by genetic engineering. In other words, once certain animal behaviors can be isolated and studied, the development of rats which are genetically more suited to tolerate the presence of nitrates, or have some predisposition to addiction to nitrate substances, could be used in conjunction with the training of rats for the purpose in question.

Figure 4:
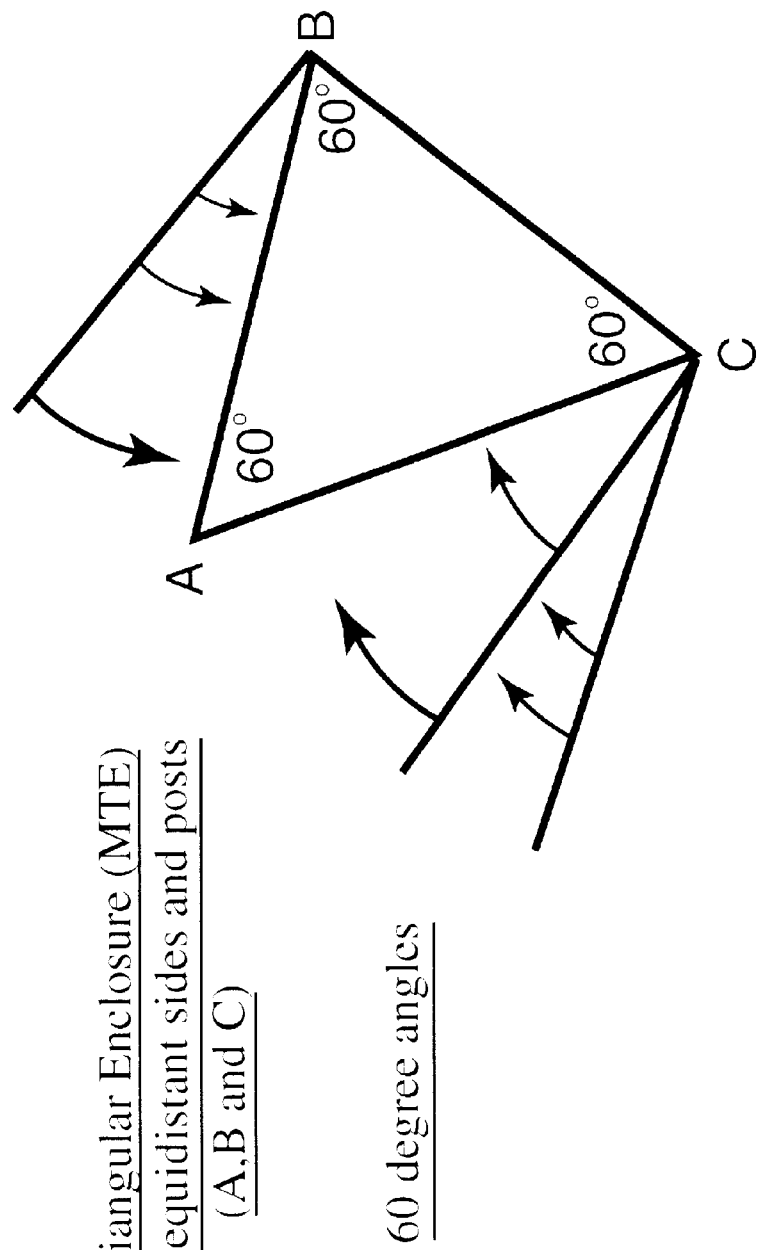
FIG. 4 illustrates the Mobile Triangular Enclosure (MTE) with three equidistant sides and posts.
Figure 6:
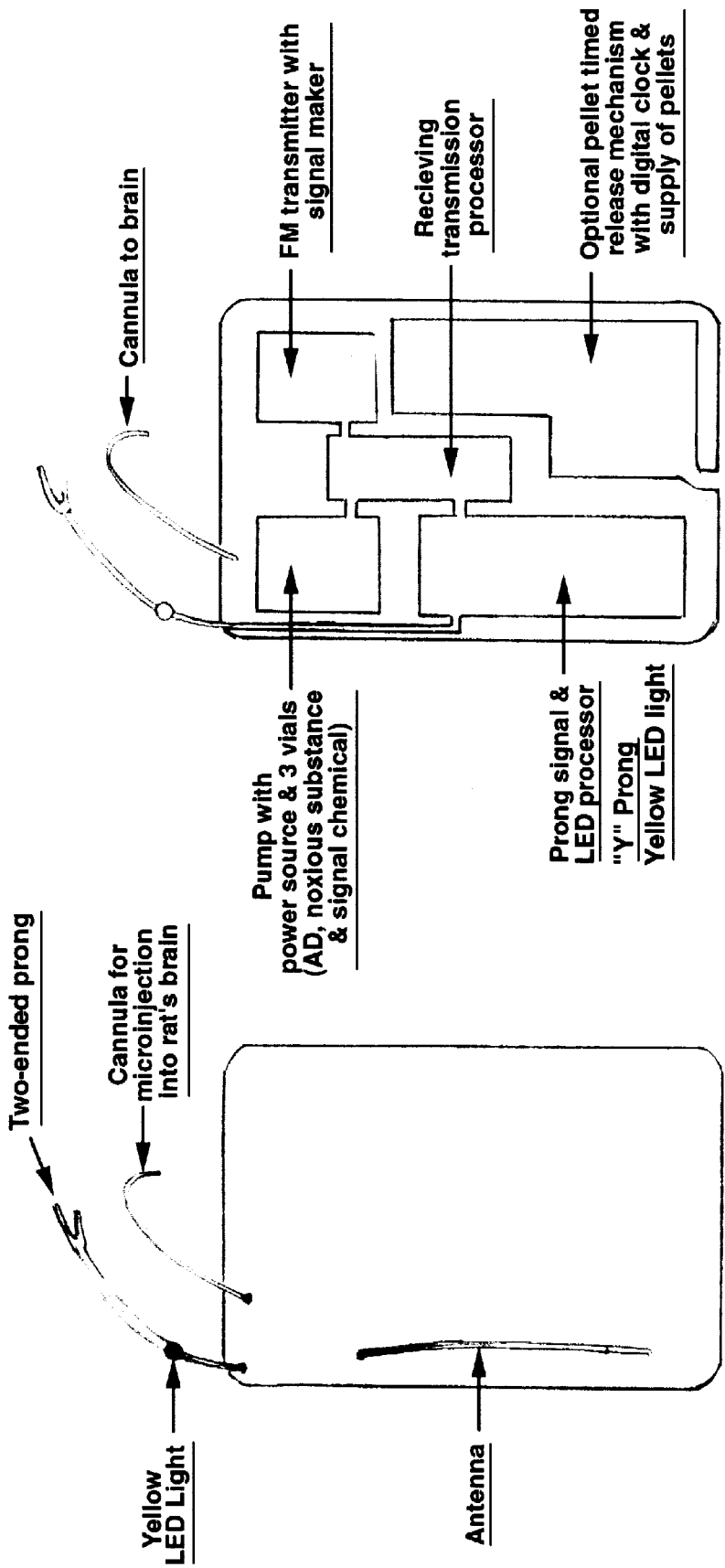
FIG. 6 shows a Knapsack Device (KD) with interactive electronic components.

2) The rats gradually learn to seek out landmines in a controlled laboratory environment and then in the field within special triangular mobile enclosures (see FIG. 4) by using their olfactory sense and drug induced drive as motivation. Knowing the exact area which has been cleared can be accomplished by setting up a triangular shaped map. The boundaries of such areas are simple to create and because each post is made equidistant, precise calculations can be made to identify the amount of the areas which have been "cleared" by the rats. Therefore, rats are released into a triangular enclosed space and begin seeking dummy landmines (DLMs) using scent, sight and/or feel.

Figure 2:
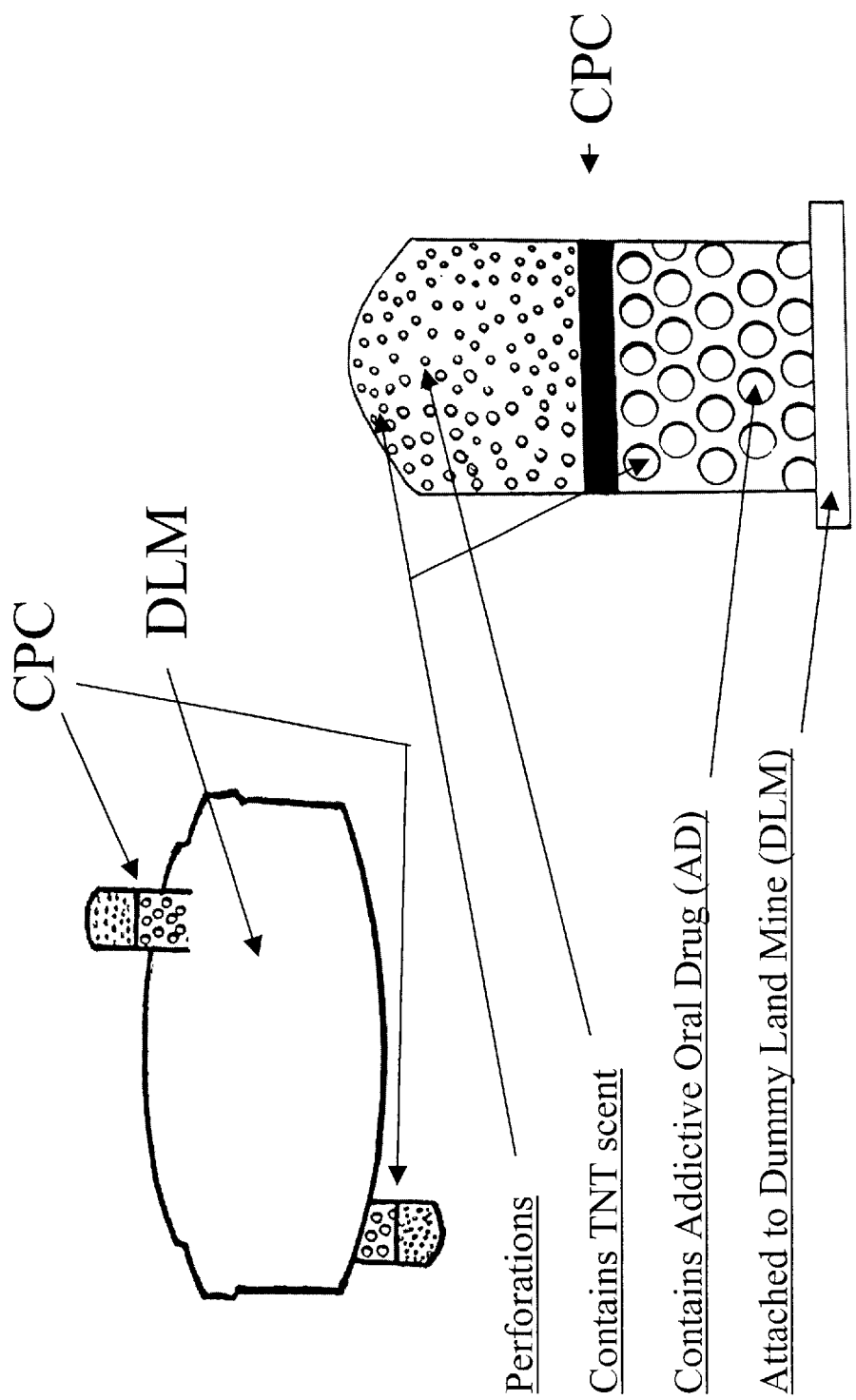
FIG. 2 shows a Dummy Land Mine with Conical Perforated Containers (CPCs).
Figure 3:
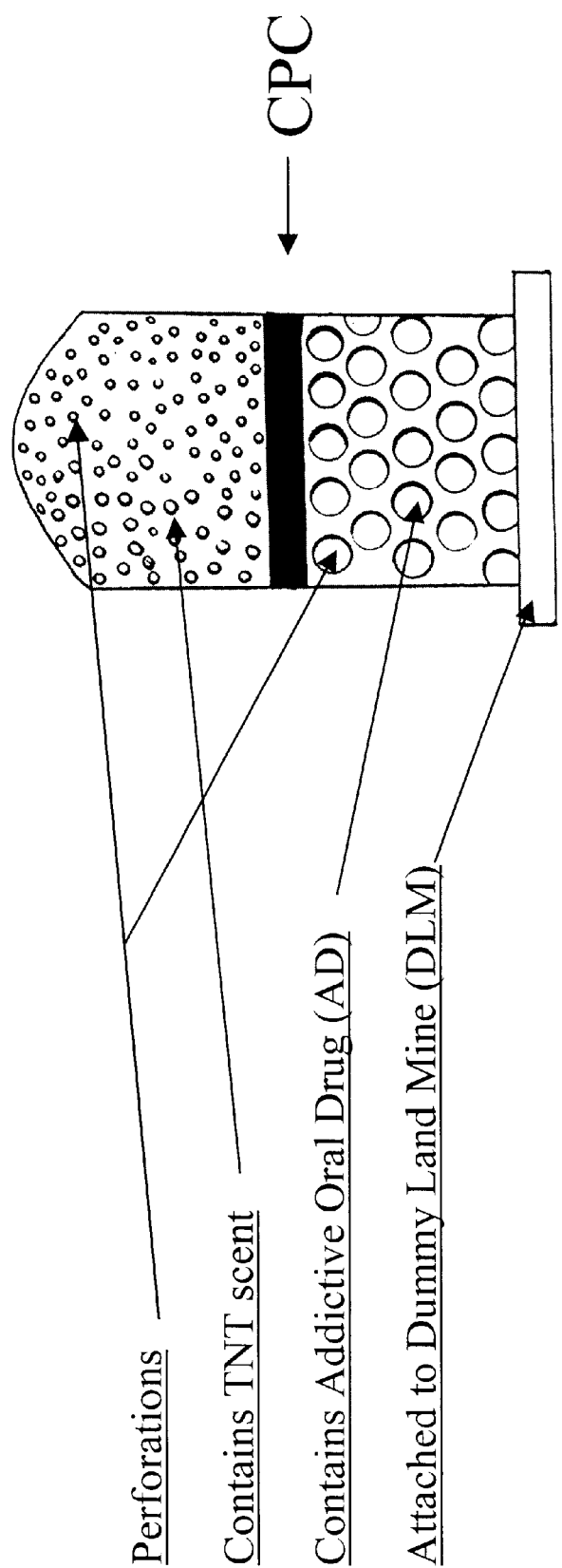
FIG. 3 shows a Conical Perforated Container (CPC) used for dispensing the substance scent and the addictive drugs.

3) Once the rats locate the landmines, they will search for the addictive substances on the surface of the DLMs and come to detect the small conical plastic perforated containers (CPCs) which house small amounts of TNT scented cotton and addictive drugs mixed with odorless food pellets. DLMs as shown in FIG. 2, release the scent of TNT from its top perforated chamber and in the lower base chamber. In other words, when the rats come upon suspect DLMs, they begin to dig around them in the hopes of finding one or more Conical Perforated Containers (CPCs) that will dispense/disperse the scent of TNT from the top perforated chamber and a few pellets of the same addictive drug (AD) in oral form contained in a lower base level chamber. This small container, the CPCs, can be 1.5 inch tall and 1.5 inch wide at the base, and may be located on any surface of a DLM, including its underside (See FIGS. 2 and 3).

4) While searching for the DLMs and the addictive substances, the rats are capable of sufficiently disturbing the landmine's specific site or location in the surrounding soil and dirt. This disturbance makes the location of the landmine more conspicuous and identifiable for human clearers, which in turn makes clearance much safer for later deactivation and/or removal by a person, with or without the aid of a dog. Thus, when the ground, soil around the DLMs have been disturbed after a certain amount of time at night (× hours), the rats are called back to their container, possibly using AD rewards. The rats learn that three short blasts from an ultrasonic horn is a signal for them to return to their home field cages. Consequently, real landmines have now become visually easier for dogs and humans to detect, clear, and remove.

5) Once the rats have spent a sufficient amount of time searching for and "digging up" landmines, they can be summoned back to their transport cages by a signal of a subsonic horn device to which the rats have been trained to respond positively. This "recall" method is made more certain because rats are trained to receive the immediate rewards of food mixed with the addictive drug when they respond to the subsonic horn device used.

6) In some circumstances, the rats'activity may detonate the mines. Because the rats search only within a confined area (the triangular enclosure MTE; see FIG. 4) and are not accompanied by humans or trained dogs, occasional detonation of landmines during this process will not cost any human lives or cause the loss of trained dogs. In some cases, detonation may indeed be the desired outcome, wherein the training can be modified to condition and train the rats to manipulate the sensory device of small landmines simulators in the laboratory. That is, creating the expectation of receiving the addictive drug/food mixture, the rats can be trained to disturb the sensory devices in the laboratory sufficient to cause detonation of a real landmine in the field.

7) Use of other devices and methods can enhance the above methods, when used alone or in combination therewith. The methods which can be used to achieve a precise localization and identification of the dummy landmines (DLM) may include the implementation of:

(i) A small rectangular plastic container which may be attached to the rats'back as if it were a knapsack (Knapsack Device-KD) (see FIG. 5). A KD can consist of a small light plastic/rubber container having an elliptical shape which is fastened to the rats' back using small harness of plastic or heavy cloth. It can house a small battery and machine that dispenses small pellets through a rear opening at regular set time intervals. These pellets can be of bright color and may also fluoresce under ultraviolet light and possess a very distinctive odor to aid in their localization by sight and/or smell the next day after the rats have been removed. Specifically, the KD can be a small rectangular plastic box containing a number of small colored pellets (about 6 mm in diameter) which releases colored pellet or pellets, one at a time, every predetermined amount of seconds. Consequently, the area where the rat spends most of its time "searching" for a landmine will have a disproportionally large amount of colored pellets compared to areas where no landmine is found because the rats will spend more time digging up a suspect DLM in an area which contains the landmine. Clustered droppings of these pellets will be found in an active area with landmines, and human clearers will be able to subjectively judge and ascertain, depending on different characteristics such as type of the terrain and other variables, whether an area harbors active landmines. The trainer's ability to predict the performance of the rats can be strengthened by placing the rats in a field location where the DLM contain two or more CPC on its surface, thereby making the rats spend more time around these additive-reinforced landmines so that a trainer may know whether the rats will perform basically in the same way in a field with real landmines. This approach may be very beneficial and well-suited for use by indigenous villagers because there is no great need to highly skilled personnel and local young rats and inexpensive drugs such as nicotine, amphetamine or narcotics may be used.

(ii) A KD containing a small transmitter which emits an individually numbered signal every predetermined duration, which in turn, is detected by three equidistantly placed antennae (on the posts of the MTE) so that the signal is triangulated, analyzed and then plotted on a computer screen that is scaled to the area and shape of the Mobile Triangular Enclosure (MTE) may be used in conjunction or alone. With this method and apparatus, mine clearing personnel have more information, such as the number and the likely locations of suspect landmines. When they approach these areas alone or with their dogs, there is a greater margin of safety, effectiveness and efficiency. More discrete units of land can be safely cleared in less time and at less overall cost. This type of objective proficiency testing may help develop a high rate of accuracy relative to normal data from conventional landmine removal training programs. More specifically, this variation consists of another type of KD containing a small battery powered FM transmitter designed to send a certain signal every x number of seconds. Three simple antennae, each located at a defined place, e.g., at the three angles of an isosceles triangle formed by the triangular enclosure, cab receive the signal. As the signals are received, the data is analyzed by a simple triangulation program to determine the exact location of the rat relative to the parameters of the triangular area enclosed and then graphed based on frequency of signals. As each rat spends more time at one particular location, more signals will mark that location which can be readily identified by the PC graphing program. This method allows very accurate identifications of locations.

(iii) A KD containing a small anterior prong which protrudes forward into the left-sided field of vision of the rat. Midway on this prong there is a small light which is turned on and off from afar by a signal controlled by a computer program designed for this purpose. At the distal tip of this prong there is a small two-edged clasp which can be pressed together when a rat bites it. In other words, this type of KD contains a small semi-flexible extension on one side which extends to be in the animals'field of vision and has a small yellow light near its tip at which there is a small two pronged y-shaped tip. This allows for the rat to lean over and click both ends of the prong to make a clicking sound. The rat must first find the DLMs and determine if it houses any CPCs. In the laboratory, some DLMs will indeed have CPCs where if the rats should bite or tug at the tiny pronged handle, the rats will receive a mildly noxious injection of a chemical instead of the AD. Therefore, if the CPC is present, the rat simply eats it. If the CPC is not present, in order for the rat to self-administer the AD via microinjection and be assured of receiving the AD, the animal must repeat the trained steps as described above. Therefore, this type of KD contains a small amount of addictive drug dispensed directly into the rats'brain by means of a small cannula. The rat first finds a suspect DLM and digs it up. Because this may take several minutes, there is a large number of signals from the rat's KD in that location. The computer program sends a preprogrammed signal to the rat's KD and a light is turned on. The rat is conditioned to interpret this to mean that if it now bites the distal clasp while the light is on, it will receive an immediate reward of a small amount of addictive drug which is sent directly to its brain via the cannula. After a few seconds the light is turned off and the computer has identified the precise location of the rat at this time. The light will no longer be turned on again in that location. The rat then knows that it should "move on" and find another DLM to repeat the process and obtain an additional dose of the drug in this way. This type of training can be achieved because the rats are taught in the laboratory and in the field that, if they bite the clasp while the light is not turned on, they will immediately receive a noxious stimulus. This type of KD device and method may be appropriate for dense urban areas and for use by the military personnel to clear not only landmine areas but also unexploded ordinance. Other security or law enforcement entities may use this method for locating caches of hidden weapons or narcotics. In short, this type of variation consists of a KD having a microinjection mechanism that gives the rat an intracranial micro-dose of AD, if and only if, the DLMs do not have CPCs on their surface and if the tiny handle is bitten or tugged at by the rats. Using this method, the rats would be trained to ascertain whether there are no CPC on the DLM. The rat will be sure that it is safe to tug at the tiny handle and self-administer the AD, if and only if, the tiny yellow light is in the turned on. Simultaneously, a FM signal is transmitted for later analysis and plotting similar to what has been described above. Finally, after the computer has identified the location of the rat, it sends a signal that instructs the KD to turn off the small yellow light while the rats location is within 15 inches from the last identified DLM. Accordingly, the rat learns that it must move to another location to find a new DLM in order to get a fresh "fix" of the AD. The KD which is used in this method as well as the other methods above have a small elliptical shape about ¾ of an inch thick and weighing about 30 to 50 grams that is attached to the rats'back to appear like a miniature knapsack. For the method described herein, the underside part of the KD houses a flexible small tube that leads from the KD to a sub-cutaneous lodged hypodermic or an indwelling intracranial cannula. The tube itself contains three separate smaller tubes connected to a connector inside the KD so three different substances can be administered in any sequence. In front and on the left side of the KD, a small rigid tube extends forward to lie near the rats'mouth. Near the tip of this rigid tube, a small LED yellow light can be made visible, including a small two-pronged set of a tiny handle that emits a clicking noise when pressed together by the rats own teeth in a biting or gnawing movement. Within the KD, the following components may be found: (1) a small transmitter and receiver capable of dependable short distance, (2) a device that can be controlled by certain reception signals to cause an attached mini-pump to inject any one of the three substances through the tubes, (3) a device that, in response to certain signals can cause the small yellow LED light to turn off or on or flicker, and (4) another electronic device that constantly emits a tracking FM signal to determine the exact location of the rat at any given time.

The above described steps exploit not only the rats'sense of smell, but their ability to sense form and shapes of objects, i.e., their abilities to discern different tactile stimuli. Importantly, this method could be used with other types of animals, such as bird, bats, or free ranging dogs, to aid in the identification and location of objects having certain shape, smell and/or contours. Other related applications possible with this method could include the identification and location of hidden caches of illicit addictive drugs hidden in the holds of ship among large crates of fruit, for instance.

The novel features of the present invention provides human clearers of the most critical information: the exact location of an active mine, accomplished through the unearthing and tracking of the animal done by a marking technology system. The rats are capable of being trained to show the mine itself, including any unanticipated features such as booby traps which other animals such as dogs cannot provide. Present methods and technologies now available only provide localization to a very limited degree. Vital information concerning the location of active mines is preconceived, and mostly unknown to the clearing personnel. The present method and device of the present invention provides them with this knowledge by exposing any otherwise visible booby trap mechanisms and wire connections to remote detonation sites, and may neutralize or detonate any booby trap mechanisms which would have otherwise explode with simple handling/unearthing by untrained persons.

The foregoing is meant to illustrate, but not to limit the scope of the invention. Indeed, those of ordinary skill in the art can readily envision and produce further embodiments, based on the teachings herein, without undue experimentation. The present invention may be embodied in other specific forms without departing from its essential characteristics. The described embodiment is to be considered in all respects only as illustrative and not as restrictive. The scope of the invention is, therefore, indicated by the appended claims rather than by the foregoing description. All changes which come within the meaning and range of the equivalence of the claims are to embraced within their scope.

What is claimed is:

1. A method for deactivating active field land mines comprising the steps of training live animals in a controlled environment to respond to certain negative and positive reinforcement and releasing said live organisms into a land mine field to detect and unearth active land mines by responding to said certain positive and negative reinforcement.

2. The method of claim 1, wherein said live animals are trained to develop an addiction to nitrate-based substances.

3. The method of claim 1, wherein said live animals are trained to detect containers housing nitrate-based addictive substances, said containers further housing odorless food pellets.

4. The method of claim 1, wherein said live animals are trained to search for nitrate-based addictive substances and disturb the soil and dirt surrounding the active land mines.

5. The method of claim 1, wherein said animals can be trained to return to their original transport cages through a subsonic horn recall method.

6. The method of claim 1, wherein said live animals carry a knapsack device that releases conspicuous pellets at predetermined intervals of time for identification of said live animals' most active sites of concentration and rapid detection of active landmines by landmine clearing personnel.

7. The method of claim 1, wherein said live animals carry a knapsack device which emits individually numbered signals at predetermined intervals of time, which can be detected by equidistantly placed posts for confinement and easy identification of active landmines location and areas.

\* \* \* \* \*

UNITED STATES PATENT AND TRADEMARK OFFICE
CERTIFICATE OF CORRECTION

PATENT NO. : 6,382,070 B1
DATED : May 7, 2002
INVENTOR(S) : Rodolfo Garcia and Maurice M. Garcia It is certified that error appears in the above-identified patent and that said Letters Patent is hereby corrected as shown below:

<u>Title page,</u>
Item [54], title, "LANDMINDS" should read -- LANDMINES --.
Item [76], "Witshire" should read -- Wilshire --.

Signed and Sealed this

Twenty-fourth Day of September, 2002

*Attest:*

*Attesting Officer*

JAMES E. ROGAN
*Director of the United States Patent and Trademark Office*